US007614946B2

(12) United States Patent
Nicely

(10) Patent No.: US 7,614,946 B2
(45) Date of Patent: Nov. 10, 2009

(54) CARD GAME ENABLING SEPARATE EVALUATIONS FOR MULTIPLE GAME OUTCOME COMBINATIONS

(75) Inventor: Mark C. Nicely, Daly City, CA (US)

(73) Assignee: IGT, Reno, NV (US)

( * ) Notice: Subject to any disclaimer, the term of this patent is extended or adjusted under 35 U.S.C. 154(b) by 0 days.

(21) Appl. No.: 11/222,203

(22) Filed: Sep. 8, 2005

(65) Prior Publication Data

US 2006/0066051 A1 Mar. 30, 2006

Related U.S. Application Data

(60) Provisional application No. 60/610,237, filed on Sep. 15, 2004.

(51) Int. Cl.
*G06F 17/00* (2006.01)
*G06F 19/00* (2006.01)

(52) U.S. Cl. ............................. 463/13; 463/11; 463/12; 463/16; 273/274; 273/292

(58) Field of Classification Search ............. 463/11-13, 463/16; 273/274, 292
See application file for complete search history.

(56) References Cited

U.S. PATENT DOCUMENTS

| | | | |
|---|---|---|---|
| 2,228,180 | A | 1/1941 | Pauli |
| 2,474,573 | A | 6/1949 | Cohen |
| 3,589,729 | A | 6/1971 | Girard |
| 3,876,208 | A | 4/1975 | Wachtler et al. |
| 3,998,462 | A | 12/1976 | Goott |
| 4,648,604 | A | 3/1987 | Horan |
| 4,743,022 | A | 5/1988 | Wood |
| 4,861,041 | A | 8/1989 | Jones et al. |
| 4,948,128 | A | 8/1990 | Emery, II et al. |
| 4,948,134 | A | 8/1990 | Suttle et al. |
| 5,014,988 | A | 5/1991 | Mirando et al. |

(Continued)

OTHER PUBLICATIONS

"Double Handed High-Low", Hoyle's Modern Encyclopedia of Card Games, Walter B. Gibson, Doubleday & Company, Inc., p. 248 and pp. 228-234, 1974.

(Continued)

*Primary Examiner*—Peter DungBa Vo
*Assistant Examiner*—Milap Shah
(74) *Attorney, Agent, or Firm*—K&L Gates LLP

(57) ABSTRACT

A card game and method of playing the card game is disclosed. The card game involves placing cards into pre-defined card positions in the form of grids or matrices. For example, a 3×3 grid is filled with nine cards. Game outcome combinations are defined by three horizontal, three vertical and two diagonal pay lines. Another grid arrangement includes a 3×3 grid with each row and column having an extra card position at each end thereof. Accordingly, after the 3×3 grid is filled with random cards, a player may select one or more pay lines after which the two extra card positions are filled. The player is paid for any winning hands formed of the five card defined by the selected pay lines. Countless grid arrangements and pay lines are conceivable. In other versions, the player may replace one or more initially dealt, displayed or otherwise provided cards. The card game and method disclosed herein may be played through an electronic gaming device, over the Internet or at a live gaming table with a dealer.

11 Claims, 16 Drawing Sheets

U.S. PATENT DOCUMENTS

| | | | | |
|---|---|---|---|---|
| 5,019,973 | A | | 5/1991 | Wilcox et al. |
| 5,022,653 | A | | 6/1991 | Suttle et al. |
| 5,033,744 | A | * | 7/1991 | Bridgeman et al. ........... 463/13 |
| 5,042,818 | A | | 8/1991 | Weingardt |
| 5,098,107 | A | | 3/1992 | Boylan et al. |
| 5,100,137 | A | | 3/1992 | Fulton |
| 5,118,109 | A | | 6/1992 | Gumina |
| 5,118,114 | A | | 6/1992 | Tucci |
| 5,154,429 | A | | 10/1992 | LeVasseur |
| 5,165,693 | A | | 11/1992 | Handlon, Sr. |
| 5,167,413 | A | | 12/1992 | Fulton |
| 5,188,363 | A | | 2/1993 | Marnell, II et al. |
| 5,248,142 | A | | 9/1993 | Breeding |
| 5,251,897 | A | | 10/1993 | Fulton |
| 5,255,915 | A | | 10/1993 | Miller |
| 5,265,882 | A | | 11/1993 | Malek |
| 5,277,424 | A | | 1/1994 | Wilms |
| 5,280,915 | A | | 1/1994 | Grossman |
| 5,286,023 | A | | 2/1994 | Wood |
| 5,288,081 | A | | 2/1994 | Breeding |
| 5,291,120 | A | | 3/1994 | Schultz |
| 5,294,120 | A | | 3/1994 | Schultz |
| 5,303,929 | A | | 4/1994 | Sandeen |
| 5,308,065 | A | | 5/1994 | Bridgeman |
| 5,320,356 | A | | 6/1994 | Cauda |
| 5,328,189 | A | | 7/1994 | Malek |
| 5,332,219 | A | | 7/1994 | Marnell et al. |
| 5,342,047 | A | | 8/1994 | Heidel et al. |
| 5,356,140 | A | | 10/1994 | Dabrowski et al. |
| 5,377,993 | A | | 1/1995 | Josephs |
| 5,382,025 | A | | 1/1995 | Sklansky et al. |
| 5,411,257 | A | | 5/1995 | Fulton |
| 5,415,404 | A | | 5/1995 | Joshi et al. |
| 5,417,430 | A | | 5/1995 | Breeding |
| 5,437,451 | A | | 8/1995 | Fulton |
| 5,451,054 | A | | 9/1995 | Orenstein |
| 5,452,899 | A | | 9/1995 | Skratulia et al. |
| 5,486,005 | A | | 1/1996 | Neal |
| 5,489,101 | A | | 2/1996 | Moody |
| 5,496,038 | A | | 3/1996 | Kangsanaraks |
| 5,531,440 | A | | 7/1996 | Dabrowski et al. |
| 5,531,441 | A | | 7/1996 | Dabrowski et al. |
| 5,531,448 | A | | 7/1996 | Moody |
| 5,542,669 | A | | 8/1996 | Charron et al. |
| 5,544,892 | A | | 8/1996 | Breeding |
| 5,570,885 | A | | 11/1996 | Ornstein |
| 5,573,249 | A | | 11/1996 | Johnson |
| 5,577,731 | A | | 11/1996 | Jones |
| 5,580,053 | A | | 12/1996 | Crouch |
| 5,630,753 | A | | 5/1997 | Fuchs |
| 5,639,092 | A | | 6/1997 | Macaisa |
| 5,653,140 | A | | 8/1997 | Dabrowski et al. |
| 5,664,781 | A | | 9/1997 | Feola |
| 5,722,891 | A | | 3/1998 | Inoue |
| 5,725,428 | A | | 3/1998 | Achmuller |
| 5,732,950 | A | | 3/1998 | Moody |
| 5,743,530 | A | | 4/1998 | Sklad et al. |
| 5,743,799 | A | | 4/1998 | Houriet et al. |
| 5,779,549 | A | | 7/1998 | Walker et al. |
| 5,807,172 | A | * | 9/1998 | Piechowiak .................. 463/20 |
| 5,813,911 | A | | 9/1998 | Margolin |
| 5,816,915 | A | * | 10/1998 | Kadlic ......................... 463/13 |
| 5,816,916 | A | | 10/1998 | Moody |
| 5,820,460 | A | | 10/1998 | Fulton |
| 5,823,873 | A | * | 10/1998 | Moody ........................ 463/13 |
| 5,839,732 | A | | 11/1998 | Guidi |
| 5,845,907 | A | | 12/1998 | Wells |
| 5,868,618 | A | | 2/1999 | Netley et al. |
| 5,868,619 | A | | 2/1999 | Wood et al. |
| 5,879,233 | A | | 3/1999 | Stupero |
| 5,882,259 | A | | 3/1999 | Holmes et al. |
| 5,882,260 | A | | 3/1999 | Marks et al. |
| 5,885,158 | A | | 3/1999 | Torango et al. |
| 5,897,436 | A | | 4/1999 | Singer et al. |
| 5,908,353 | A | | 6/1999 | Andrews |
| 5,909,875 | A | | 6/1999 | Weingardt |
| 5,911,419 | A | | 6/1999 | Delaney et al. |
| 5,921,550 | A | | 7/1999 | Awada |
| 5,934,675 | A | | 8/1999 | Handelman et al. |
| 5,947,821 | A | | 9/1999 | Stone |
| 5,947,822 | A | | 9/1999 | Weiss |
| 5,951,012 | A | | 9/1999 | Feola |
| 5,954,335 | A | | 9/1999 | Moody |
| 5,964,464 | A | | 10/1999 | Jones |
| 5,971,849 | A | | 10/1999 | Falciglia |
| 5,975,529 | A | | 11/1999 | de Keller |
| 5,976,016 | A | | 11/1999 | Moody et al. |
| 5,988,643 | A | | 11/1999 | Awada |
| 5,997,002 | A | | 12/1999 | Goldman |
| 6,007,066 | A | | 12/1999 | Moody |
| 6,007,424 | A | | 12/1999 | Evers et al. |
| 6,012,719 | A | | 1/2000 | Webb |
| 6,012,720 | A | | 1/2000 | Webb |
| 6,019,374 | A | | 2/2000 | Breeding |
| 6,045,129 | A | | 4/2000 | Cooper et al. |
| 6,048,267 | A | | 4/2000 | Wichinsky |
| 6,050,568 | A | | 4/2000 | Hachquet |
| 6,056,641 | A | | 5/2000 | Webb |
| 6,062,980 | A | | 5/2000 | Luciano |
| 6,079,710 | A | | 6/2000 | Brown |
| 6,079,711 | A | | 6/2000 | Wei et al. |
| 6,089,978 | A | | 7/2000 | Adams |
| 6,093,100 | A | | 7/2000 | Singer et al. |
| 6,098,985 | A | | 8/2000 | Moody |
| 6,102,400 | A | | 8/2000 | Scott et al. |
| 6,110,040 | A | | 8/2000 | Sanduski et al. |
| 6,120,378 | A | | 9/2000 | Moody et al. |
| 6,129,357 | A | | 10/2000 | Wichinsky |
| 6,131,907 | A | | 10/2000 | Nucifora et al. |
| 6,131,908 | A | | 10/2000 | Palmer |
| 6,132,311 | A | | 10/2000 | Williams |
| 6,135,882 | A | | 10/2000 | Kadlic |
| 6,135,883 | A | | 10/2000 | Hachquet |
| 6,146,271 | A | | 11/2000 | Kadlic |
| 6,149,156 | A | | 11/2000 | Feola |
| 6,149,157 | A | | 11/2000 | Saun |
| 6,149,521 | A | | 11/2000 | Sanduski |
| 6,159,095 | A | | 12/2000 | Frohm et al. |
| 6,168,521 | B1 | | 1/2001 | Luciano et al. |
| 6,173,955 | B1 | | 1/2001 | Perrie et al. |
| 6,176,781 | B1 | | 1/2001 | Walker et al. |
| 6,206,374 | B1 | | 3/2001 | Jones |
| 6,206,780 | B1 | | 3/2001 | Awada |
| 6,220,959 | B1 | * | 4/2001 | Holmes et al. ................ 463/13 |
| 6,227,969 | B1 | | 5/2001 | Yoseloff |
| 6,237,916 | B1 | | 5/2001 | Webb |
| 6,241,607 | B1 | | 6/2001 | Payne |
| 6,248,016 | B1 | | 6/2001 | Walker et al. |
| 6,257,979 | B1 | | 7/2001 | Walker et al. |
| 6,270,078 | B1 | | 8/2001 | Leone et al. |
| 6,270,079 | B1 | | 8/2001 | Chamberlain |
| 6,270,405 | B1 | | 8/2001 | Ferguson |
| RE37,414 | E | | 10/2001 | Harlick |
| 6,299,532 | B1 | | 10/2001 | Smith |
| 6,305,686 | B1 | | 10/2001 | Perrie et al. |
| 6,311,978 | B1 | | 11/2001 | Moody |
| 6,315,291 | B1 | | 11/2001 | Moody |
| 6,322,445 | B1 | | 11/2001 | Miller |
| 6,332,614 | B1 | | 12/2001 | Hesse |
| 6,332,839 | B2 | | 12/2001 | Walker et al. |
| 6,334,613 | B1 | | 1/2002 | Yoseloff |
| 6,334,614 | B1 | | 1/2002 | Breeding |
| 6,336,859 | B2 | | 1/2002 | Jones et al. |
| 6,342,007 | B1 | | 1/2002 | Wood et al. |

| | | | | |
|---|---|---|---|---|
| 6,345,823 | B1 | 2/2002 | Webb | |
| 6,358,144 | B1 | 3/2002 | Kadlic et al. | |
| 6,364,313 | B1 | 4/2002 | Moody | |
| 6,371,851 | B1 | 4/2002 | Singer et al. | |
| 6,402,150 | B1 | 6/2002 | Jones | |
| 6,405,174 | B1 | 6/2002 | Walker et al. | |
| 6,406,023 | B1 | 6/2002 | Rowe | |
| 6,409,173 | B1 | 6/2002 | Tri | |
| 6,409,174 | B1 | 6/2002 | Demarest | |
| 6,416,407 | B1 | 7/2002 | Carrico et al. | |
| 6,419,578 | B1 | 7/2002 | Moody et al. | |
| 6,428,002 | B1 | 8/2002 | Baranauskas | |
| 6,435,506 | B1 | 8/2002 | Piccoli | |
| 6,443,456 | B1 * | 9/2002 | Gajor | 273/303 |
| 6,461,240 | B1 | 10/2002 | Perkins | |
| 6,478,675 | B1 | 11/2002 | Awada | |
| 6,506,116 | B1 | 1/2003 | Sunaga et al. | |
| 6,511,068 | B1 * | 1/2003 | Sklansky et al. | 273/237 |
| 6,517,074 | B1 | 2/2003 | Moody | |
| 6,533,658 | B1 | 3/2003 | Walker et al. | |
| 6,537,150 | B1 | 3/2003 | Luciano et al. | |
| 6,561,898 | B2 | 5/2003 | Moody | |
| 6,568,680 | B1 | 5/2003 | Moody et al. | |
| 6,595,520 | B1 * | 7/2003 | Richards et al. | 273/292 |
| 6,652,377 | B1 | 11/2003 | Moody | |
| 6,672,959 | B2 | 1/2004 | Moody et al. | |
| 6,676,511 | B2 * | 1/2004 | Payne et al. | 463/20 |
| 6,695,695 | B2 * | 2/2004 | Angel | 463/13 |
| 6,923,446 | B2 | 8/2005 | Snow | |
| 6,955,356 | B2 | 10/2005 | Moody | |
| 6,959,928 | B2 | 11/2005 | Schultz | |
| 6,964,418 | B2 | 11/2005 | Moody | |
| 7,000,921 | B2 | 2/2006 | Schultz | |
| 7,044,468 | B2 * | 5/2006 | Sklansky et al. | 273/292 |
| 7,222,857 | B2 | 5/2007 | Moody | |
| 7,222,858 | B2 | 5/2007 | Moody | |
| 7,258,342 | B2 * | 8/2007 | Loewenstein et al. | 273/292 |
| 7,431,643 | B2 * | 10/2008 | Dargue | 463/12 |
| 7,506,873 | B1 * | 3/2009 | Barrie | 273/274 |
| 2001/0041610 | A1 | 11/2001 | Luciano et al. | |
| 2002/0074725 | A1 * | 6/2002 | Stern | 273/274 |
| 2002/0082069 | A1 | 6/2002 | Parker | |
| 2002/0187823 | A1 * | 12/2002 | Khal | 463/13 |
| 2002/0190469 | A1 | 12/2002 | Conklin et al. | |
| 2003/0069055 | A1 | 4/2003 | Moody | |
| 2003/0073475 | A1 | 4/2003 | Friedman | |
| 2003/0130024 | A1 * | 7/2003 | Darby | 463/13 |
| 2003/0162424 | A1 * | 8/2003 | Berman | 439/131 |
| 2004/0033824 | A1 * | 2/2004 | Fitzhugh | 463/13 |
| 2004/0130023 | A1 | 7/2004 | Naiki | |
| 2004/0188938 | A1 | 9/2004 | Moody et al. | |
| 2005/0239527 | A1 | 10/2005 | Moody | |
| 2005/0239528 | A1 | 10/2005 | Moody | |
| 2006/0154714 | A1 | 7/2006 | Montross et al. | |
| 2007/0178965 | A1 * | 8/2007 | Inoue | 463/30 |

OTHER PUBLICATIONS

Double up Poker Game Description written by IGT, available prior to Sep. 2000.

Foster, R.F., Hoyle: An Encyclopedia of Indoor Games, pp. 182-183, Years 1853-1945.

Morehead et al., “Description of Poker,”; “Description of Hold’em Poker,” Hoyle’s Rules of Games, Second Revised Edition, pp. 34-63 and pp. 47-48 (1983).

Morehead et al., “Description of Poker,”; “Description of Hold’em Poker,” Offical Rules of Card Games, 53rd Edition, pp. 64-97 and pp. 78-79 (1963).

Pai gow poker description [online][printed on Jan. 15, 2007]. Retrieved from the Internet at <URL: http://en.wikipedia.org/wiki/Pai_gow_poker >.

Scarne’s New Complete Guide to Gambling, written by John Scarne, published by Simon & Schuster, Inc., pp. 490-499, 1974.

Scarne’s Encyclopedia of Card Games, written by John Scarne, 1973, HarperCollins Publishers, Inc., 278-279.

Wheel Poker Article, written by Strictly Slots, published prior to 2002.

* cited by examiner

CARD GAME ENABLING SEPARATE EVALUATIONS FOR MULTIPLE GAME OUTCOME COMBINATIONS

CROSS REFERENCE TO RELATED APPLICATIONS

This application claims the benefit of provisional application No. 60/610,237 filed Sep. 15, 2004.

FIELD OF THE INVENTION

The embodiments of the present invention relate to card-based casino games facilitated by electronic gaming devices, the Internet and live tables. More particularly, the embodiments relate to methods and systems providing for a card game wherein cards are provided to fill predefined card positions such that a multiplicity of possible outcomes and payouts are available.

BACKGROUND

There are a vast multitude of casino card games. Some card games, like Caribbean Stud Poker, Three Card Poker, Let It Ride and 3-5-7 Poker are stud games insofar as the game outcomes are based solely on the originally dealt cards. Other card games, like video poker and variations thereof, are draw games wherein the player has the opportunity to replace at least one originally dealt card in order to improve the game outcome. Depending on the game, the player may be allowed to replace all the original cards, only certain cards, only a certain number of cards, etc.

Some casino stud games also involve a dealer hand and/or require the player to make betting decisions before all game cards are revealed or dealt. For example, in Caribbean Stud Poker and Three Card Poker, the player is required to increase his or her wager in order to continue play and for comparison of the player's revealed hand to the dealer's revealed hand.

Other casino stud games do not involve a dealer hand while still other casino stud games offer the player the ability, but do not require the player, to modify his or her wager. For example, in Let It Ride, the player is offered the ability to reduce his or her wager before all of the game cards have been revealed. In 3-5-7 Poker and some blackjack games, the player is given the opportunity to surrender his or her hand thereby forfeiting one-half of his or her initial wager.

There are also casino slot machines which produce outcomes consisting of symbols arranged in a pattern with pay lines identifying certain combinations of symbols in the pattern. A winning outcome occurs when certain symbols align along an active pay line in accordance with the pay table for the game. Slot machines with multiple pay lines are often configured to activate pay lines on which the player has placed a wager. At least one game, Spin Poker, offers a video poker variation which depicts card symbols appearing on spinning reels.

In other casino slot machines, like the Bananarama With Bonus slot machine game, the vertical arrangement of symbols is fixed along a video reel where a portion of the reel is randomly selected, usually by a pay line, to generate the game outcome. Typically with such games, one symbol from each reel may align with a pay line. In other casino slot machines, like Vacation USA slot machine each symbol location is independently selected. In such games, any combination of symbols, including multiple symbols from a single reel, may align along a pay line.

SUMMARY

The embodiments of the present invention include a method and device for conducting a casino card game with the some or all of the following features:

- a play grid for receiving game cards;
- one or more pay lines placed on the play grid for defining unique card combinations forming a hand;
- ability to accept wager(s) which activate one or more pay lines;
- providing an initial card to each grid position;
- allowing the player to replace at least one card in an attempt to improve the game outcome; and
- evaluating the outcome for each active pay line and for each winning outcome, paying the player a corresponding award.

The embodiments of the present invention also include any number of variations of pay line configurations including, but not limited to, configurations wherein:

- each card is subject to one pay line;
- some or all cards are subject to two or more pay lines;
- all pay lines are in the form of straight lines;
- some or all pay lines are in a form other than a straight line;
- all pay lines intersect the same number of cards; and
- one or more pay lines intersect a different number of cards than at least one other pay line.

With respect to games having pay lines intersecting different numbers of cards, there may be different pay criteria based upon the number of cards intersected. Pay criteria may also include providing special pay awards for game outcomes utilizing all, or a majority, of the cards in the grid. For example, a special pay out may be provided if K or more of the N cards in the grid (where $K \leqq N$) are of the same suit. In such a game, a pay table may be configured such that the larger the number of cards of the same suit, wherein the number is at or above the K threshold, the larger the award. Another example is an award corresponding to a pay line intersecting final cards in the grid forming an N-card straight, N-card flush or an N-card straight flush. Such special pays may be available as a general bonus of the game or, in an alternate game configuration, may be in the form of a side bet that the player can place.

Alternately, or additionally, a special bonus award may be offered that provides the player an award based upon a combination of outcomes identified by multiple pay lines. For example, if the player obtains a winning outcome on all active pay lines, a bonus award may be defined that awards the player twice the normal amount for each award. Another example comprises a special award in response to the player obtaining a losing outcome identified by all active pay lines.

Likewise, the embodiments of the present invention contemplate any and all grid arrangement variations including, but not limited to:

- T-shaped;
- X-shaped;
- 2D square grid;
- 2D rectangular grid;
- 2D pyramid;
- other 2D arrangements, such as a snowflake pattern; or
- 3D cube or other 3D arrangements.

The embodiments of the present invention contemplate any variation wagering requirements including, but not limited to:

- no minimum wager restrictions;
- to activate a pay line, a wager must be placed thereon;
- all pay lines must have the same sized wager placed thereon; or the player places a single wager to activate a group of pay lines In other game variations, the player is allowed to replace more than one card. Players may be required to select and replace all of the cards at once or may be allowed to select and replace cards individually. In the latter case, the game may be configured such that the player may or may not be allowed to replace a card position more than once during the game.

The games offered under the embodiments of the present invention may be conducted with one or more decks of cards. Similarly, a deck may or may not include Jokers which may be used as a wild card, or alternately may be used in a manner according to the rules of Pai Gow poker. Alternately or additionally, one or more non-Joker cards may be designated as a wild card. With games having wild cards and grid positions intersected by multiple pay lines, the wild card may be evaluated differently for each pay line in order to optimize the player's outcome for each pay line. Alternately, the player may be required to select a single value for a wild card that is the single value applied regardless of the subject pay line. With games played with more than one deck of cards and/or wild cards, special payouts may be defined for outcomes where an outcome includes a certain number of the same card and suit.

Other variations, embodiments and features of the present invention will become evident from the following detailed description, drawings and claims.

DETAILED DESCRIPTION

Figure 1:
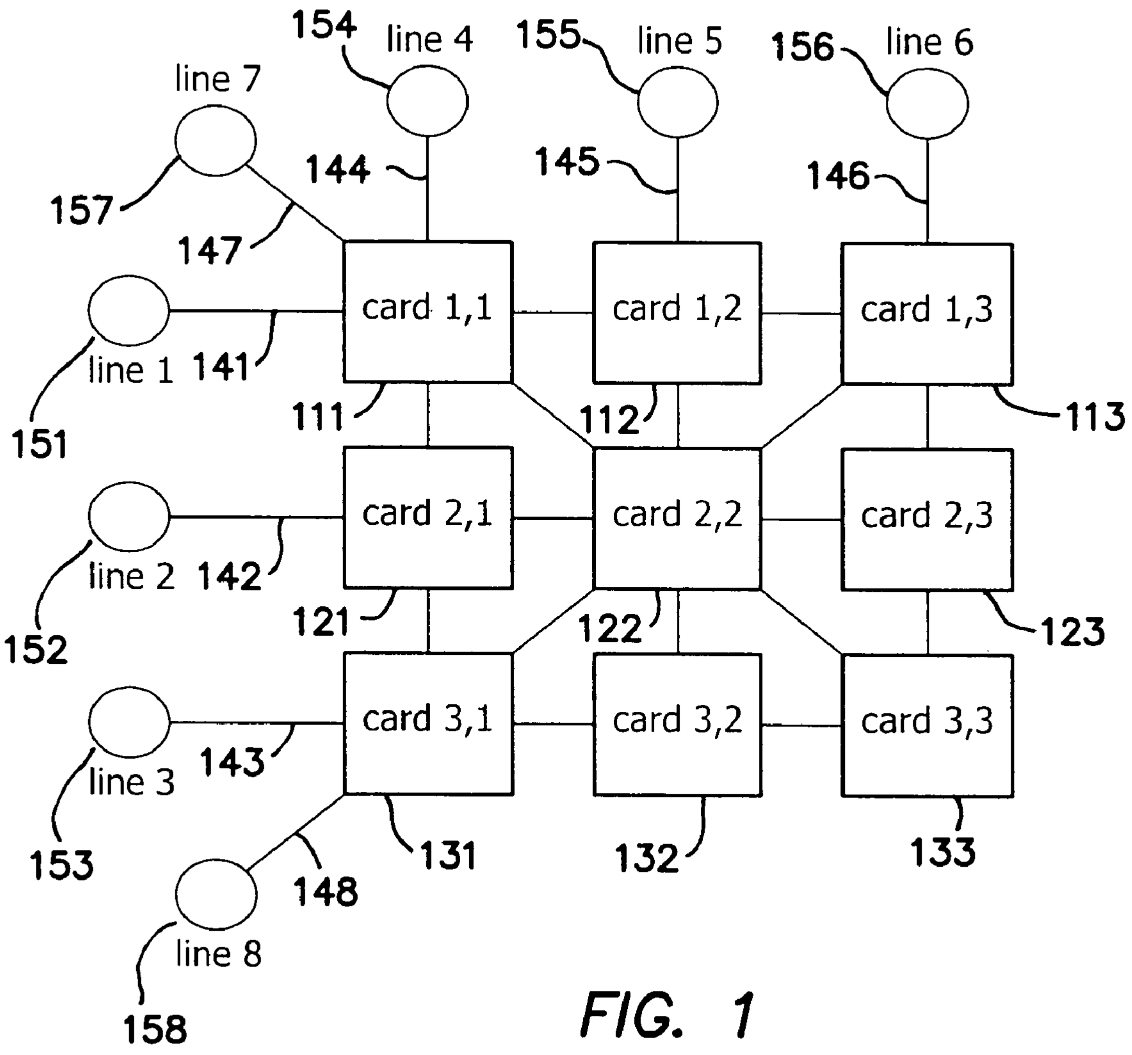
FIG. 1 shows a 3x3 grid incorporating eight pay lines and multiple wagering areas.

For the purposes of promoting an understanding of the principles in accordance with the embodiments of the present invention, reference will now be made to the embodiments illustrated in the drawings and specific language will be used to describe the same. It will nevertheless be understood that no limitation of the scope of the invention is thereby intended. Any alterations and further modifications of the inventive feature illustrated herein, and any additional applications of the principles of the invention as illustrated herein, which would normally occur to one skilled in the relevant art and having possession of this disclosure, are to be considered within the scope of the invention claimed.

The embodiments of the present invention are ideal for video-based and Internet-based applications. Therefore, the following description focuses on such applications. However, it should be noted that live applications are conceivable and within the spirit and scope of the present invention. The operation of gaming devices, Internet-based applications and live table games are well known in the art and need not be explained in great detail herein. Necessary details are noted as necessary.

Now referring to the drawings, FIG. 1 shows an example of a first embodiment of the present invention having a 3x3 square grid comprising card positions 111-113, 121-123 and 131-133 intersected by eight straight pay lines 141-148. Specifically, there are three horizontal pay lines 141-143, three vertical pay lines 144-146 and two diagonal pay lines 147, 148. As an example of a pay line arrangement, pay line 141 corresponds to the card positions 111, 112, and 113 for receiving cards 1,1, 1,2 and 1,3, respectively. At ends of each pay line 141-148 are wager areas 151-158 corresponding to that pay line. Game rules may include additional wagering requirements such as requiring a wager in all wager areas 151-158 to activate all pay lines 141-148, the same size wager placed in each wager area 151-158, etc.

Figure 2:
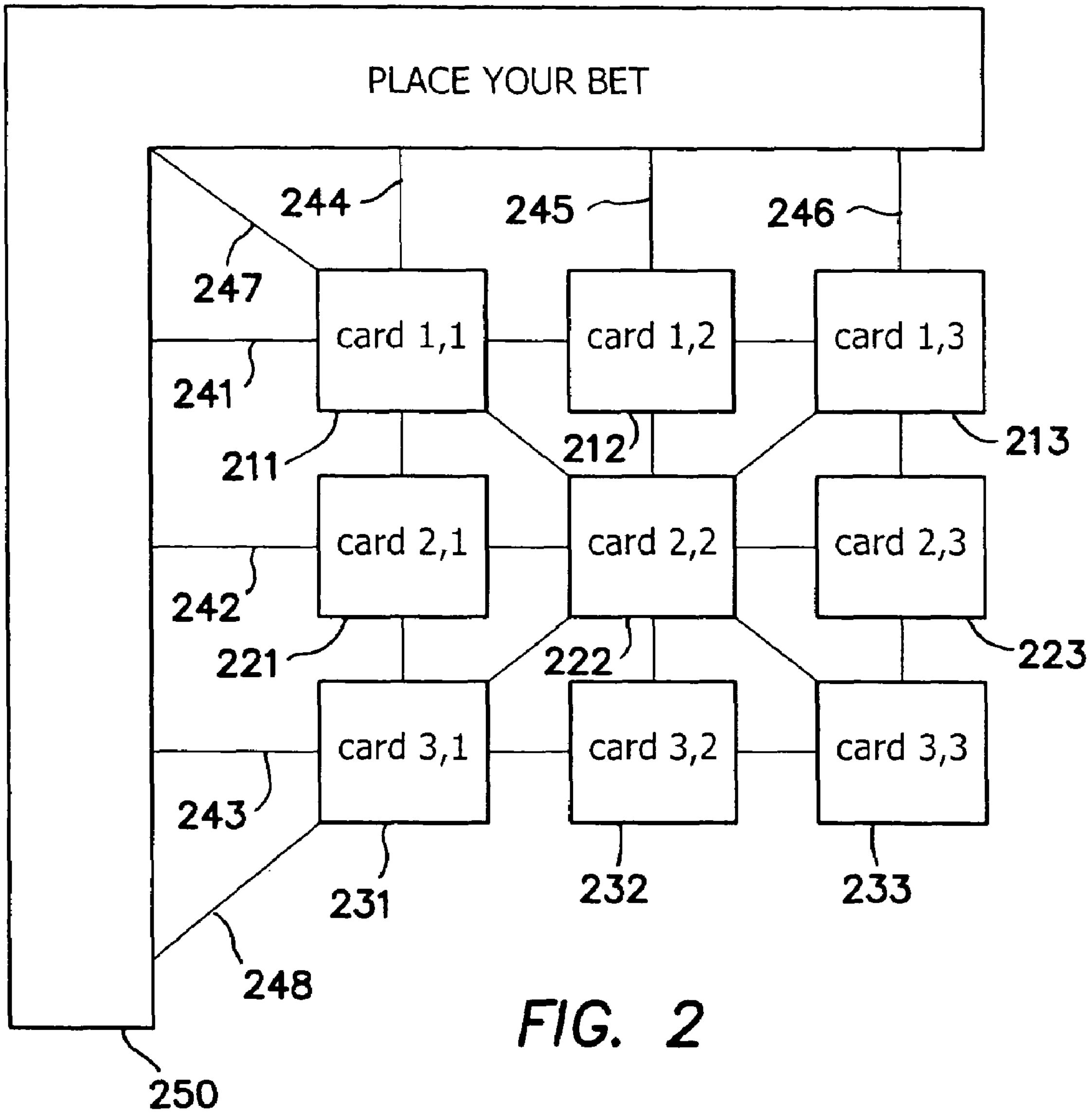
FIG. 2 shows a 3x3 grid incorporating eight pay lines and one global wager area.

FIG. 2 is similar to FIG. 1 insofar as it also depicts a sample game comprising a 3x3 square grid of card positions 211-213, 221-223 and 231-233 and eight straight pay lines 241-248. However, FIG. 2 incorporates a single wager area 250 for placement of a single wager that activates all of the pay lines 241-248.

Figure 3:
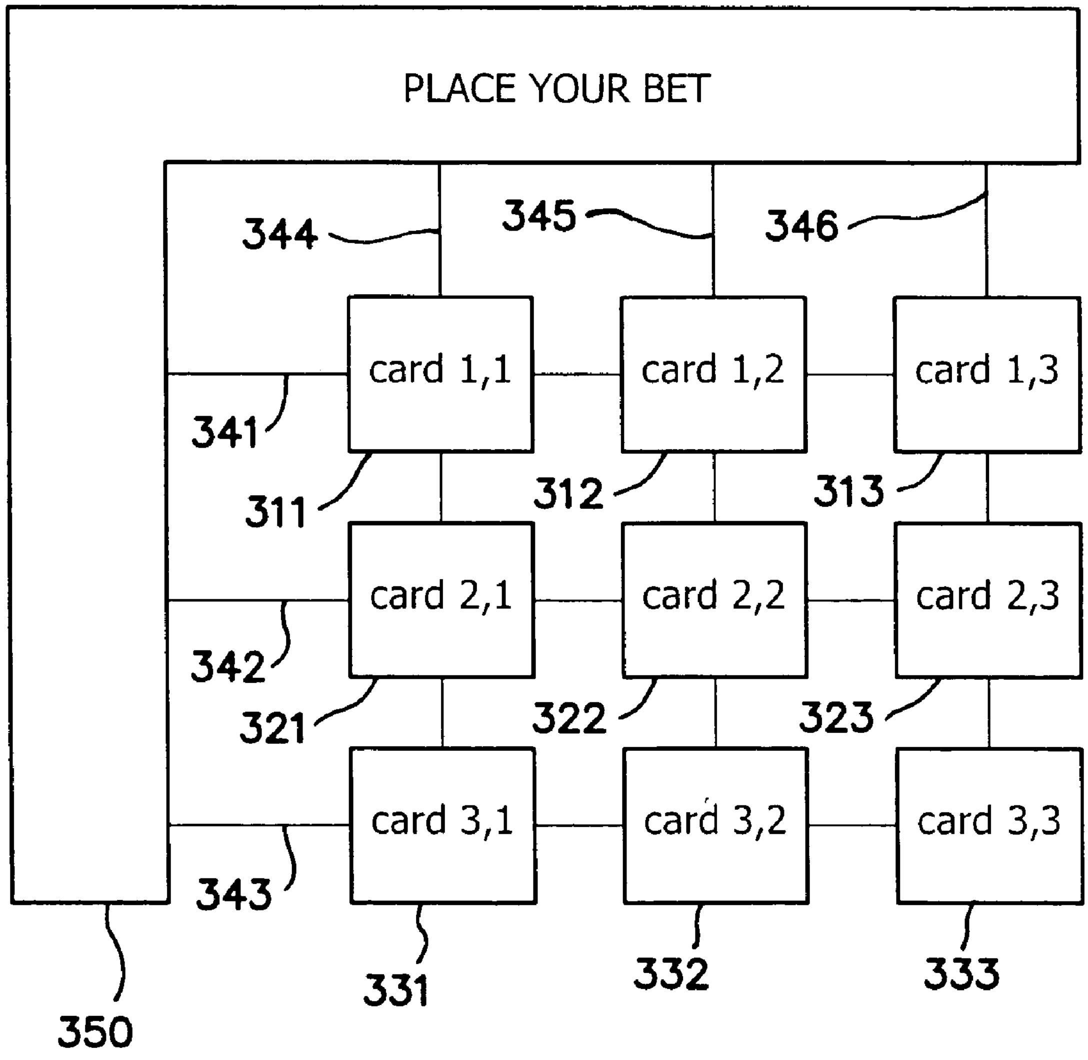
FIG. 3 shows a 3x3 grid incorporating three vertical pay lines and three horizontal pay lines.

FIG. 3 is similar to FIG. 2 insofar as it also depicts a sample game comprising a 3x3 square grid of card positions 311-313, 321-323 and 331-333 and a single wagering area 350. However, the game has a varied arrangement of pay lines. Specifically, the game comprises only three horizontal pay lines 341-343 and three vertical pay lines 344-346. That is, there are no diagonal pay lines as set forth in FIGS. 1 and 2.

Figure 4:
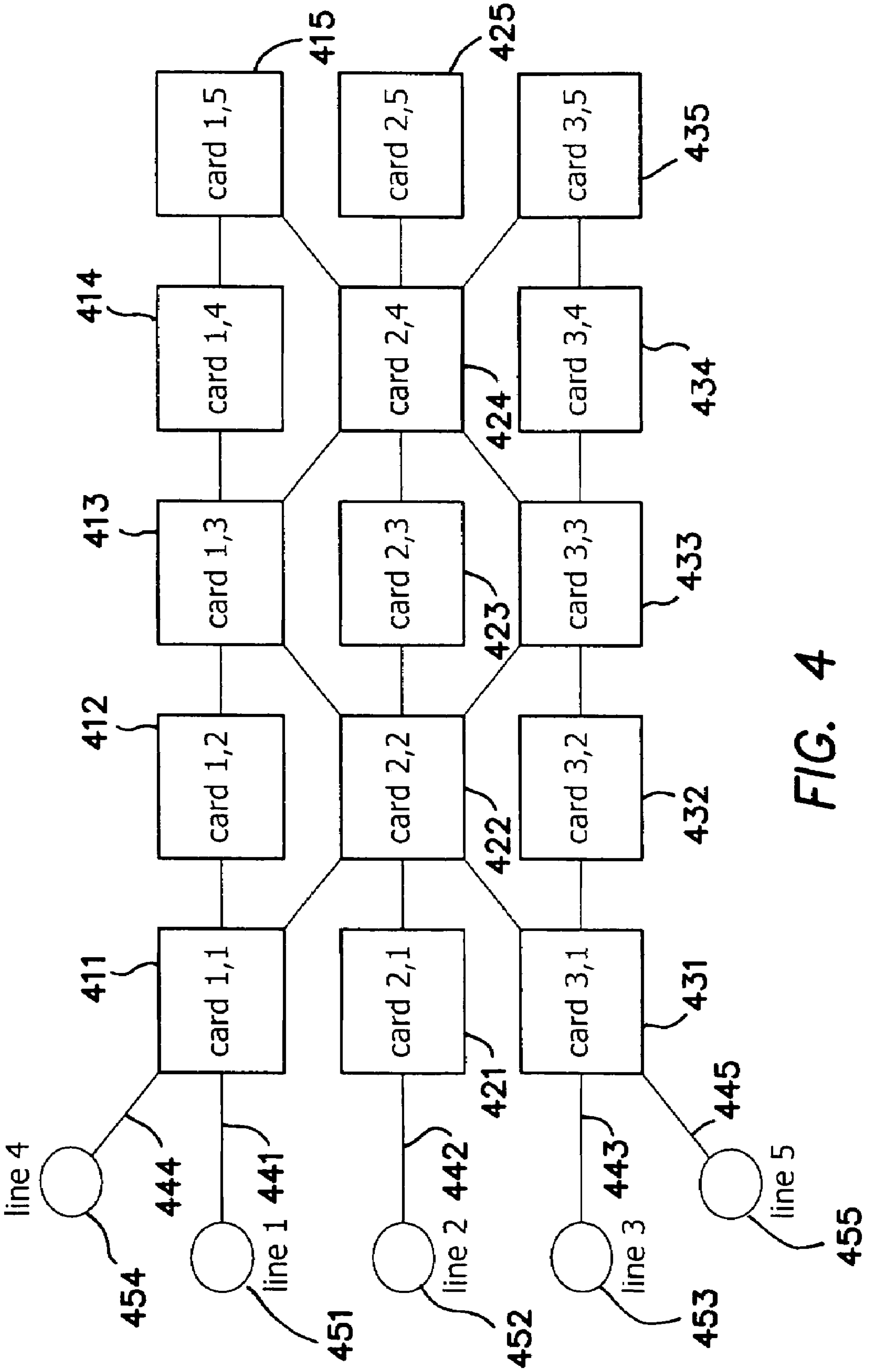
FIG. 4 shows a 3x5 grid incorporating five pay lines.

FIG. 4 depicts another grid arrangement comprising a 3x5 rectangular grid of card positions 411-415, 421-425 and 431-435 intersected by five pay lines 451-455. Each pay line 451-455 intersects five card positions which generate a game outcome for which game awards may be paid. First, there are three straight horizontal pay lines 441-443. For example, Pay line 441 intersects card positions 411, 412, 413, 414 and 415 which receive cards 1,1, 1,2, 1,3, 1,4 and 1,5, respectively. There are also two angled pay lines 444 and 445. Pay line 444 intersects card positions 411, 422, 433, 242 and 415 which receive cards 1,1, 2,2, 3,3, 2,4 and 1,5. Pay line 445 intersect card positions 431, 422, 413, 424 and 435 which receive cards 3,1, 2,2, 1,3, 2,4 and 3,5, respectively. This card position arrangement creates a situation wherein multiple card positions are intersected by multiple pay lines. As shown in FIG. 4, card positions 411, 413, 415, 422, 424, 431, 433 and 435 which receive cards 1,1, 1,3, 1,5, 2,2, 2,4, 3,1, 3,3, and 3,5, respectively, are each intersected by multiple pay lines while the other card positions are only intersected by a single pay line.

Figure 5:
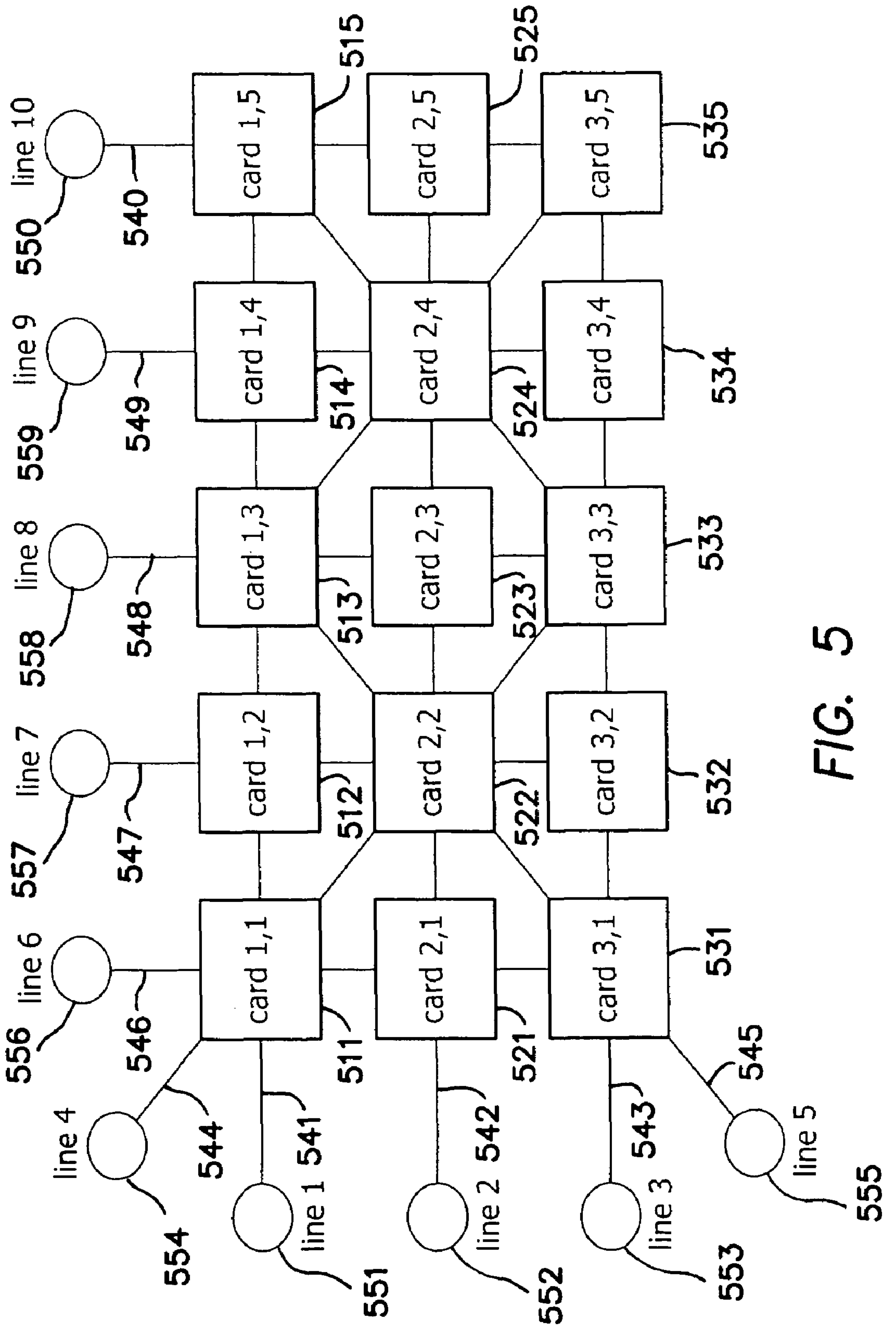
FIG. 5 shows a 5x5 grid incorporating ten pay lines.

FIG. 5 is similar to FIG. 4 in that the grid arrangement comprises a 3x5 rectangular grid of card positions 511-515, 521-525 and 531-535 intersected by five pay lines 551-555. However, the grid shown in FIG. 5 further incorporates five vertical pay lines 550, 556-559 which each intersect three card positions. This card position arrangement creates a situation wherein individual pay lines, in a single game, intersect different numbers of card positions and cards, respectively.

Figure 6:
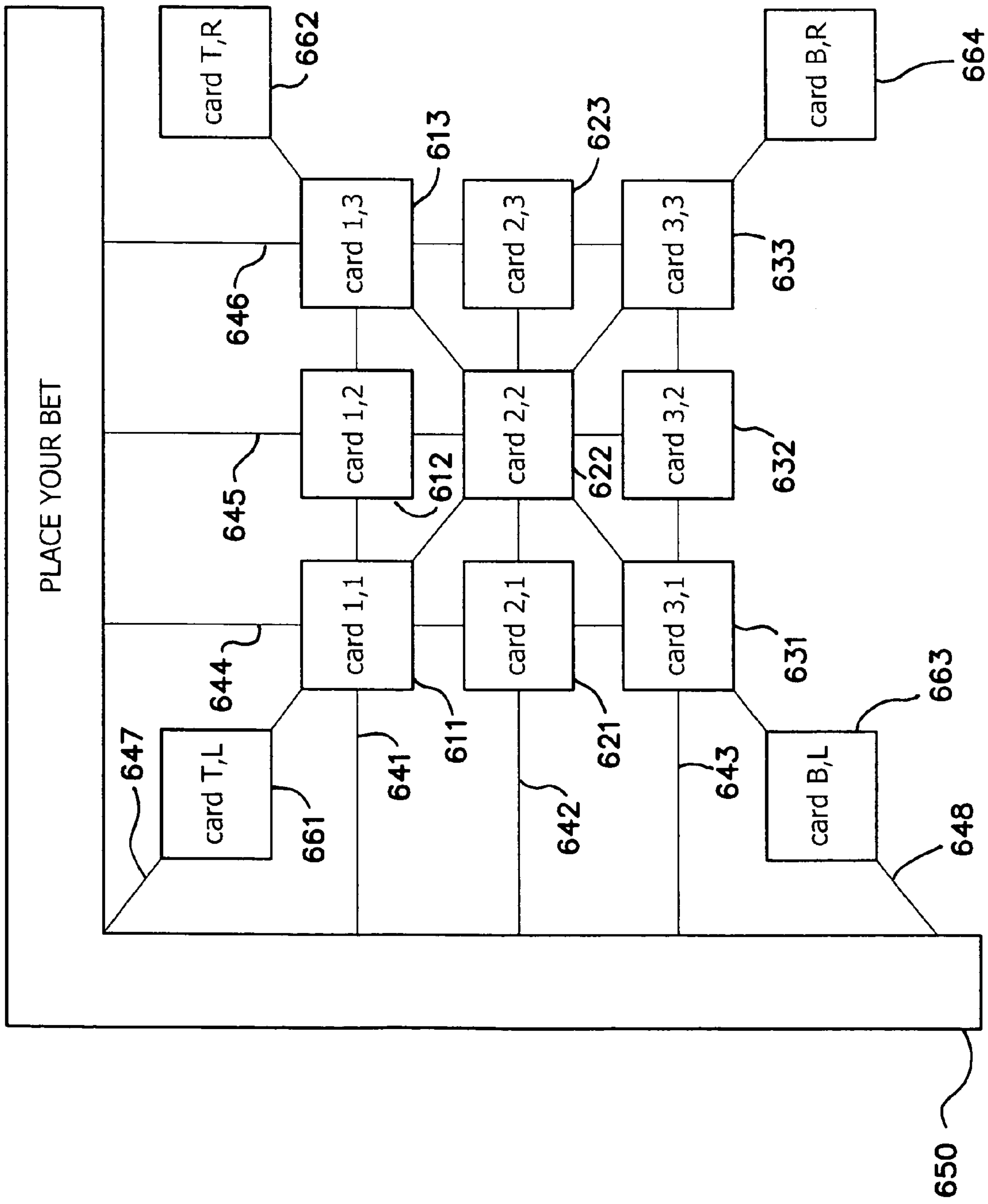
FIG. 6 shows a non-rectangular grid incorporating multiple pay lines.

FIG. 6 depicts a non-rectangular grid arrangement. The non-rectangular grid comprises three horizontal pay lines 641-643, each intersecting three card positions 611-613, 621-623 and 631-633, respectively, three vertical pay lines 644-646, each intersecting three card positions 611, 621, 631; 612, 622, 632; and 613, 623, 633, respectively, and two diagonal pay lines 647 and 648 each intersecting five card positions 661, 611, 622, 633, 664 and 662, 613, 622, 631, 663, respectively.

Figure 7:
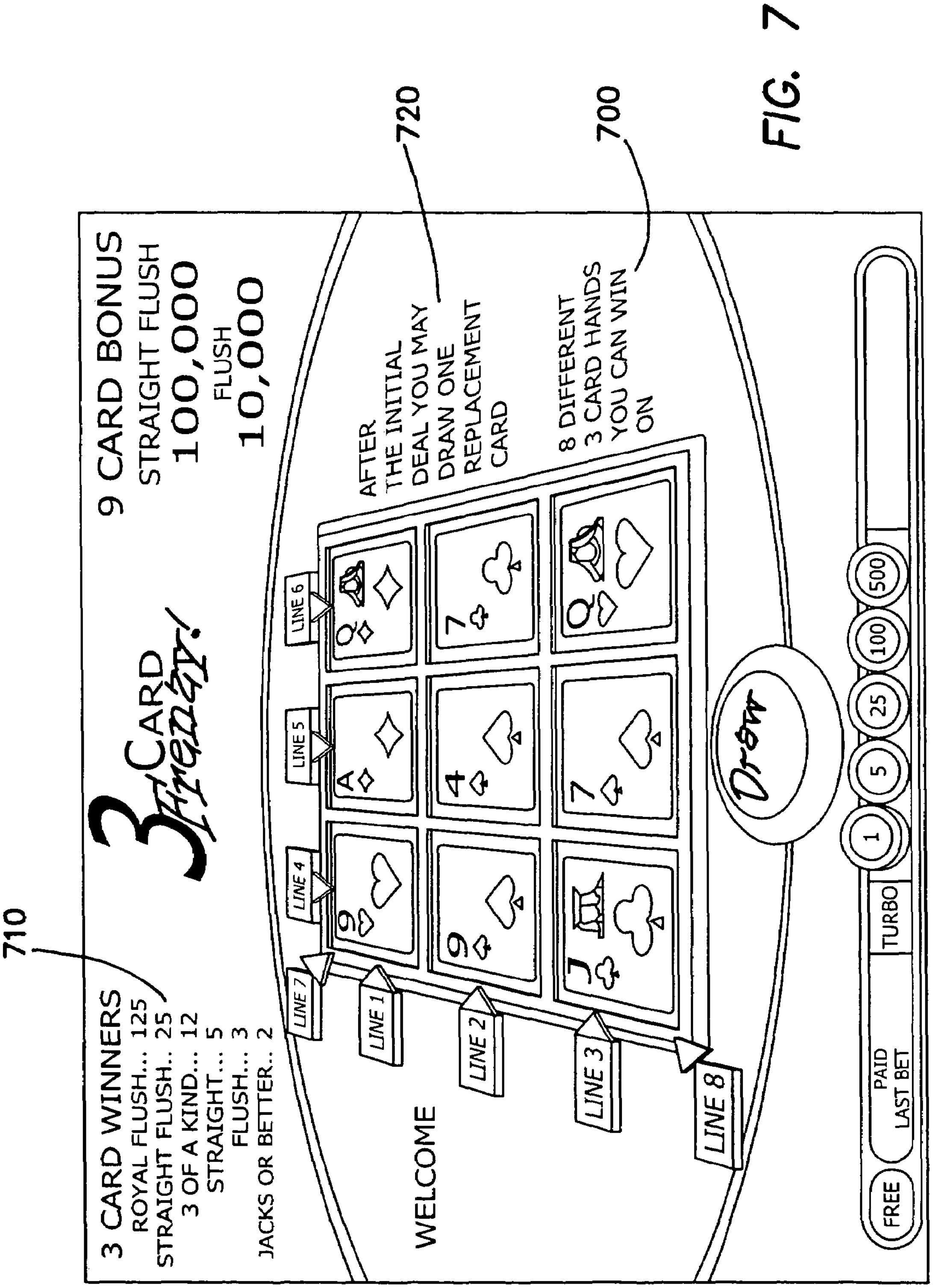
FIG. 7 shows a sample implementation of a game having a 3x3 grid.

FIG. 7 depicts a screen shot from an electronic embodiment of the present invention implemented as a video game or Internet-based game. The screen displays a 3×3 grid 700, pay table 710 and game rules 720. Furthermore, the grid 700 displayed in FIG. 7 is synonymous with an arrangement that may be implemented as a live table game using an electronic display or physical cards. Indeed, the embodiments of the present invention include depicting the grid on a table felt in a conventional manner using ink. Alternately, or additionally, the card positions may be defined by raised partitions and/or depressions in the table such that the cards are retained in place. Furthermore, with such partitions, it is possible to incorporate a card collector into which the cards drop when the game ends and that may optionally funnel the cards into a card shuffler.

Figure 8:
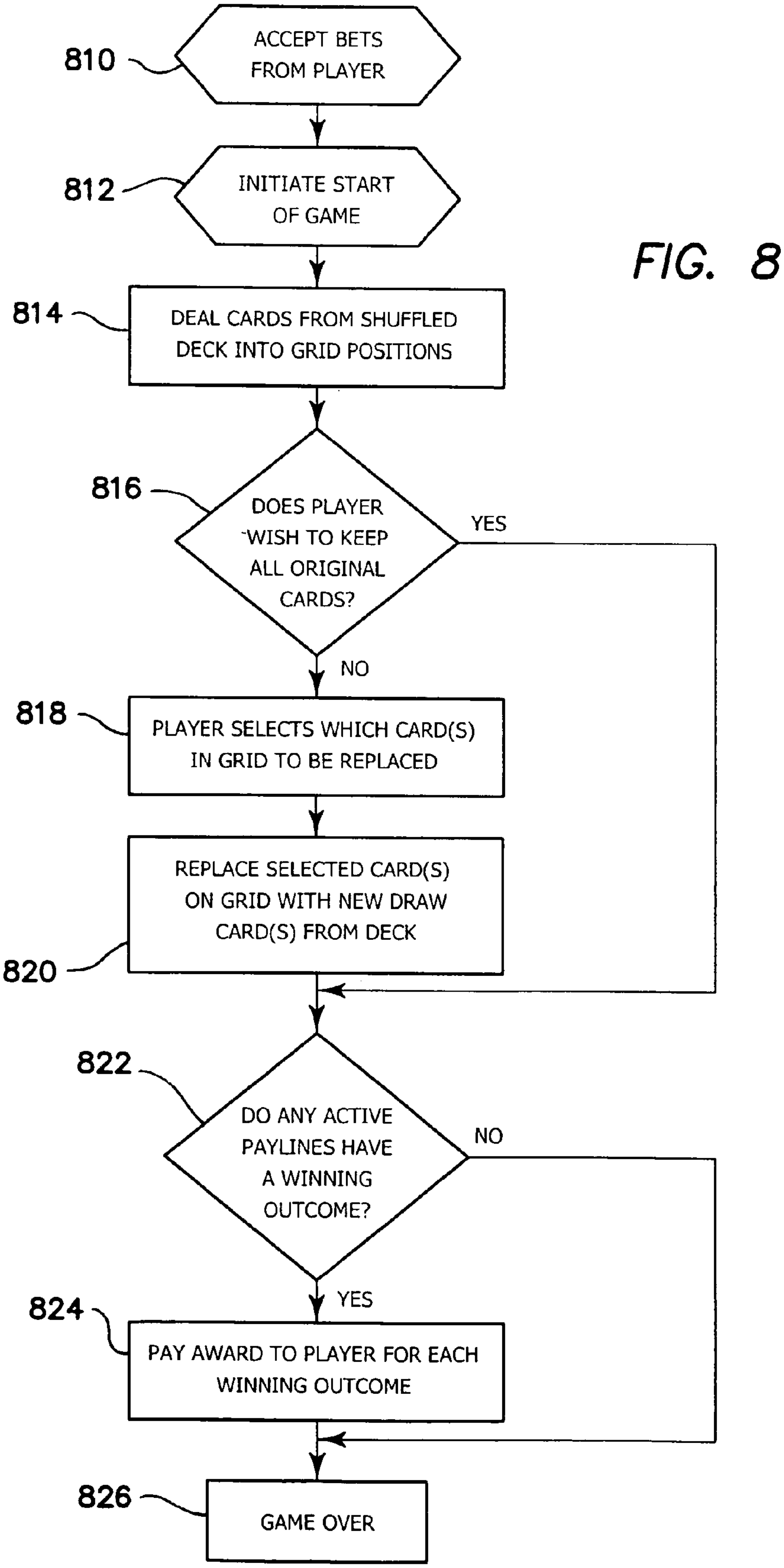
FIG. 8 shows a block diagram of a game wherein a player may replace cards once.

FIG. 8 shows a block diagram detailing one embodiment of the present invention, namely a game where the replacement cards are selected by the player one at a time. The block diagram shows acceptance of player wager 810 and the activation the game 812 which triggers random cards being dealt, displayed or otherwise provided 814 to fill each card position of the game's card grid. The player then decides whether to hold all the initial cards 816 or to discard certain card(s) 818 to be replaced with new random card(s) from the deck. At 820 replacement or draw card(s) are dealt, displayed or otherwise provided to each position selected by the player. Once all requested draw cards have been dealt, displayed or otherwise provided, the game outcome along each active pay line is examined 822 and for each winning outcome, the player is paid an award 824 relative to a pay table which defines the award amount for the given outcome and wager amount.

It should be noted that other embodiments cover a game including all of the steps shown in FIG. 8 except the step of rendering the card draw 816 optional. In such an implementation, the player must always select the card(s) to be replaced. The actual number of possible replacement cards is defined by the game and includes games wherein only one card may be replaced.

Figure 9:
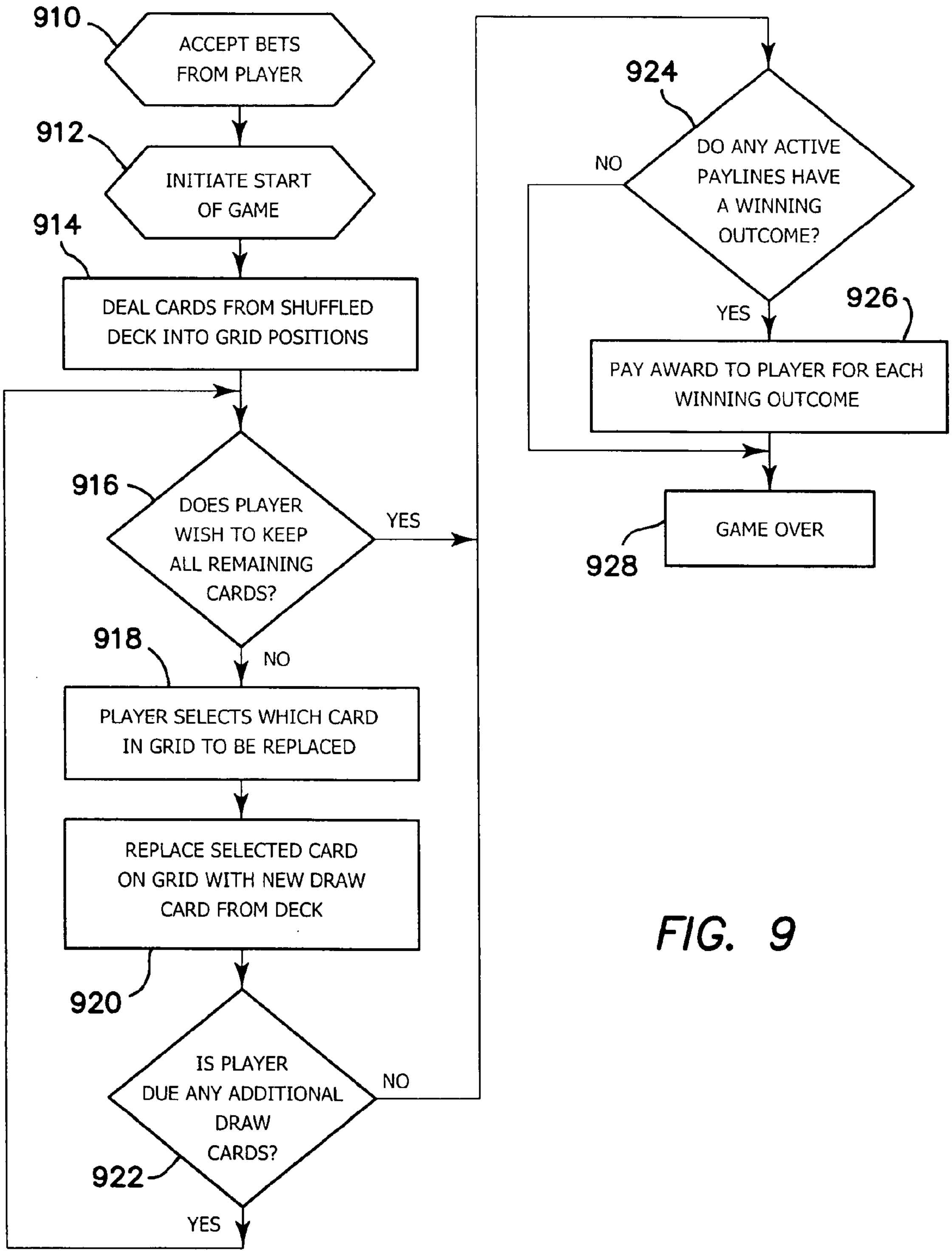
FIG. 9 shows a block diagram of a game wherein players may replace cards sequentially.

FIG. 9 shows a block diagram detailing a second embodiment of the present invention, namely a game incorporating means for a player to replace sequentially one or more cards. As with FIG. 8, a player wager is accepted 910, the game is activated 912 and the initial random cards are dealt, displayed or otherwise provided to their respective card positions 914 on the game grid. The player may hold 916 his or her initial set of cards or may select 918 a single card to be replaced 920 with a new card from the deck. For a second time, the player is able to select 918 a single card to be replaced 920 with a new card from the deck. Depending on the game, the player may be able to continue replacing cards until the no more replacement cards are available 922. Further, game rules may or may not be defined to restrict the card selection. For example, game rules may be defined to allow a player to select each card position for card replacement only once during a game. As with FIG. 8, after all draw cards have been dealt, displayed or otherwise provided, each pay line is examined 924 and winning outcomes are paid 926 before the game is ends 928.

Figure 10:
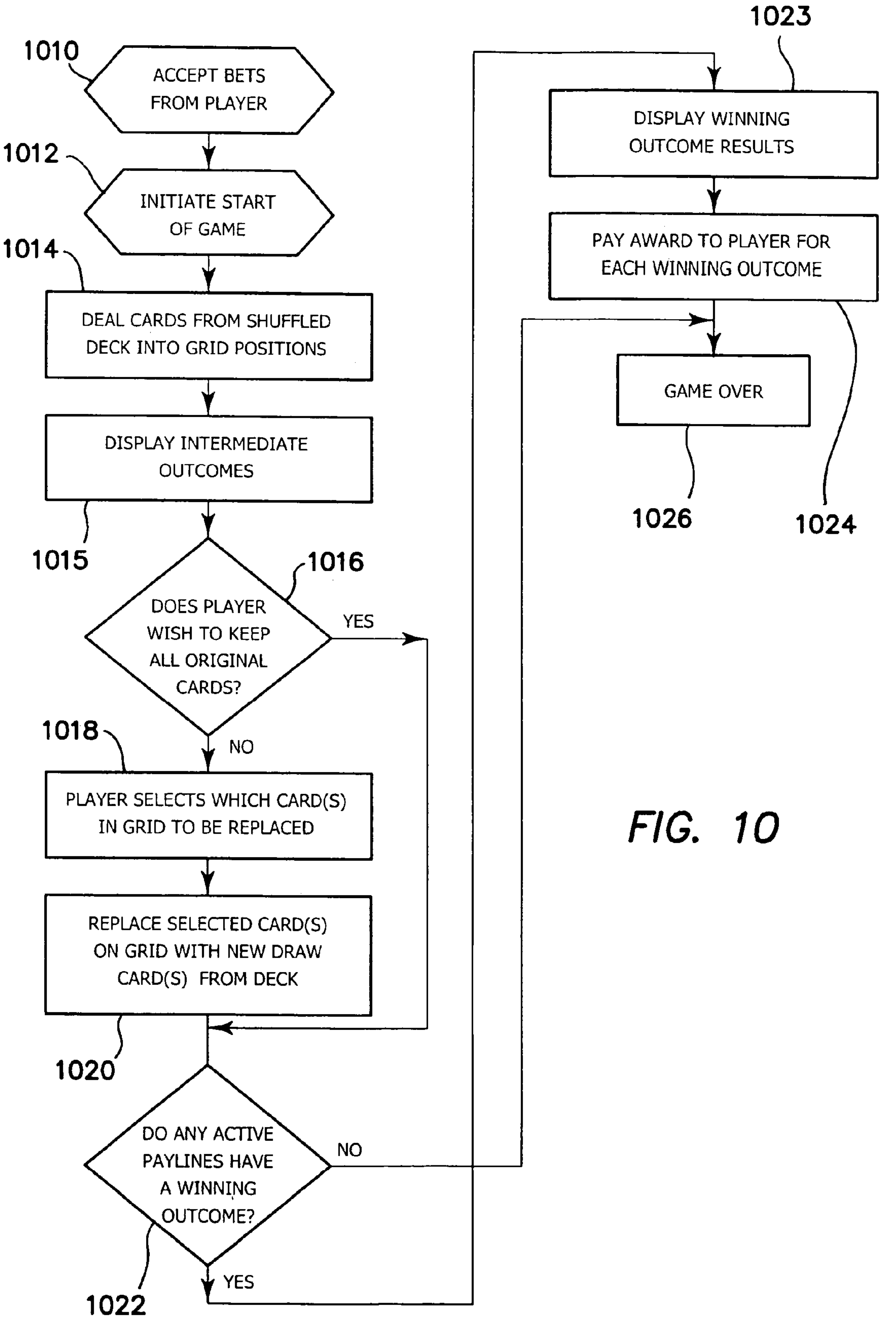
FIG. 10 shows a block diagram of a game having card replacement and outcome display.

FIG. 10 shows a block diagram detailing a third embodiment of the present invention, namely the steps of the block diagram shown in FIG. 8 but with the addition of new outcome display steps. Specifically, after the cards are dealt, displayed or otherwise provided 1014, intermediate game results are displayed 1015. Game results can include, but are not limited to, identification of any winning outcomes, indication of the value of any winning outcomes, indication of which cards, if any, are essential to a winning outcome, indication of which pay lines might become winning outcomes with the replacement of the remaining available card(s), etc. Displaying the intermediate game results makes it easier for the player to decide which card(s) to select for replacement. For example, indicating which cards are essential to a winning outcome helps the player more quickly identify which cards are suitable candidates for replacement. The block diagram of FIG. 10 also includes a similar results display step 1023 during the outcome evaluation 1022 and award payment 1024 phase of the game, whereby the type and award amounts, for example, may be displayed. This embodiment of the invention may be more readily implemented as a video game or Internet-based game. However, a programmed electromechanical device, having knowledge of the card values in each card position, implemented with a live table game may likewise display similar data.

Figure 11:
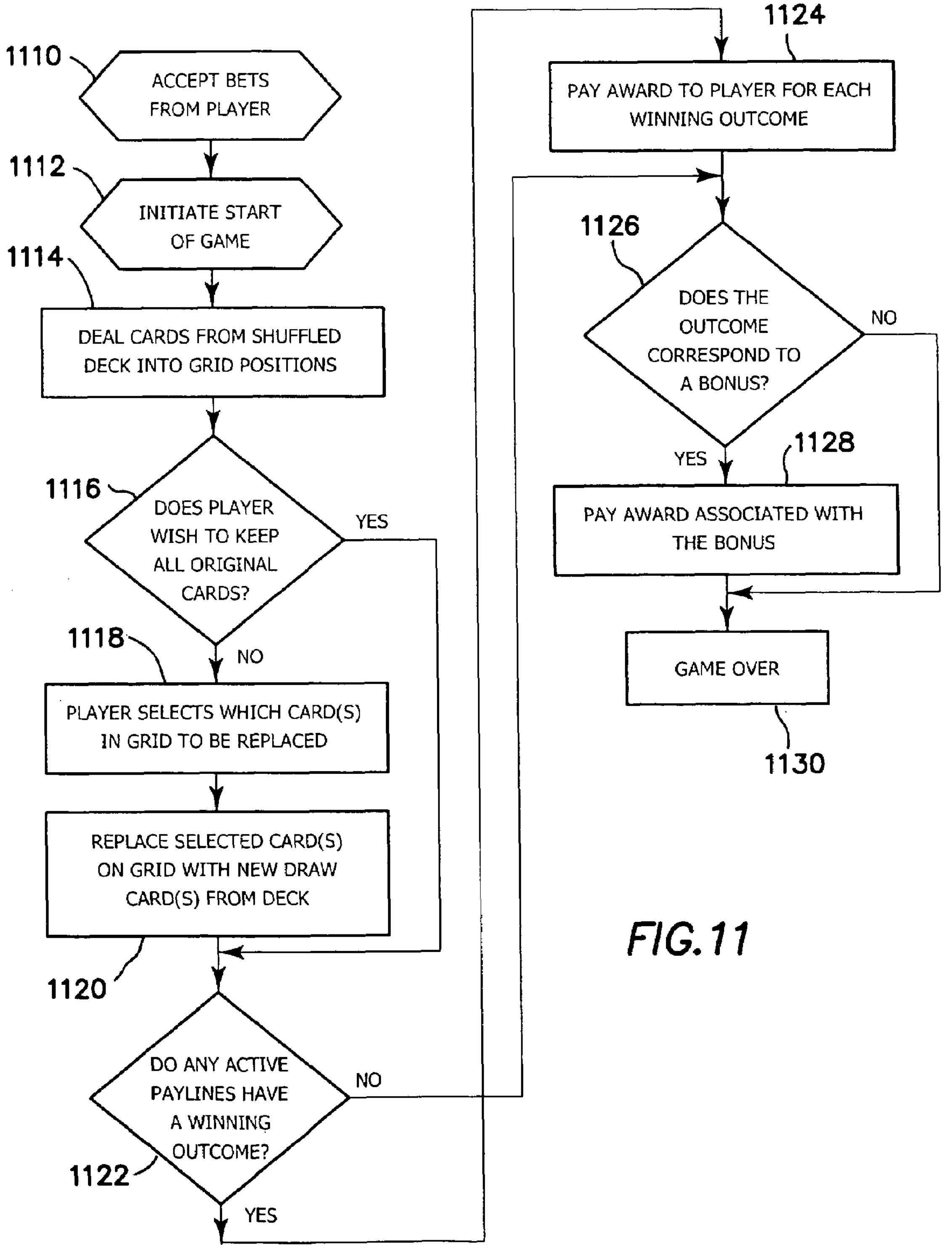
FIG. 11 shows a block diagram of a game with a bonus.

FIG. 11 shows a block diagram detailing a fourth embodiment of the present invention, namely the steps of the block diagram shown in FIG. 8 but with the addition of bonus pay steps. Specifically, in addition to evaluating 1122 and paying awards 1124 based on each pay line outcome, a bonus-triggering outcome may be evaluated 1126 and, if present, a bonus is paid 1128. An example of such a bonus is referenced in FIG. 7 which describes a "9 Card Bonus/Straight Flush 100,000/Flush 10,000." Consequently, there is a bonus paid in response to all nine cards forming a flush or straight flush.

Game rules may require certain wagering requirements for a player to be eligible for a bonus. For example, the player may be required to place a wager equivalent to, or exceeding a minimum amount. An alternate embodiment may involve a variable sized award and/or the playing of a secondary bonus event to produce the bonus payment. For example, a bonus-triggering event may cause additional cards to be dealt according to some additional rules that determine the size of the bonus award. In another example, a bonus-triggering event may cause a bonus event to occur that uses a different mechanism than main game cards to determine the bonus award to be paid.

Figure 12:
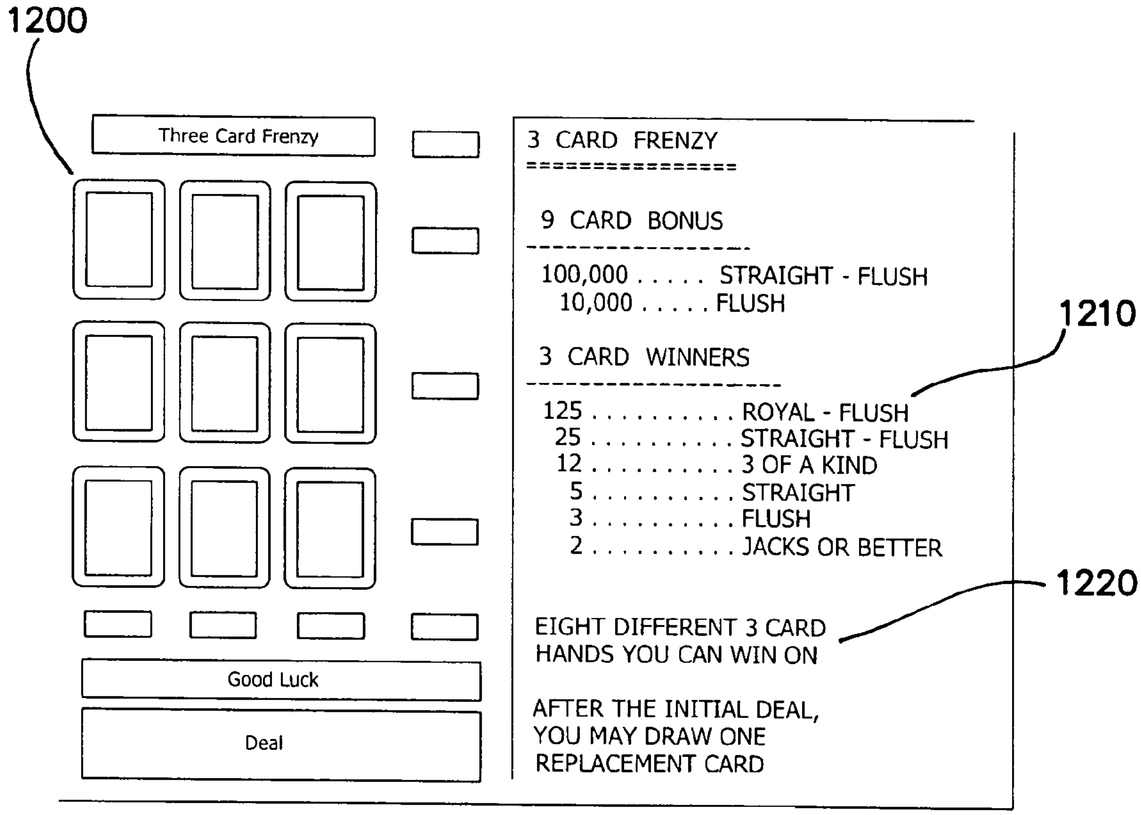
FIG. 12 shows a sample game state, namely awaiting a start of the game.

Similar to FIG. 7, FIG. 12 depicts a screen shot from an example of the game implemented as a video game or Internet-based game. It consists of a 3×3 grid of card positions 1200, pay table information 1210 and certain game rules 1220. Unlike FIG. 7, FIG. 12 depicts a pure video game implementation. FIG. 12 shows the state of the game with the player being prompted to initiate play.

Figure 13:
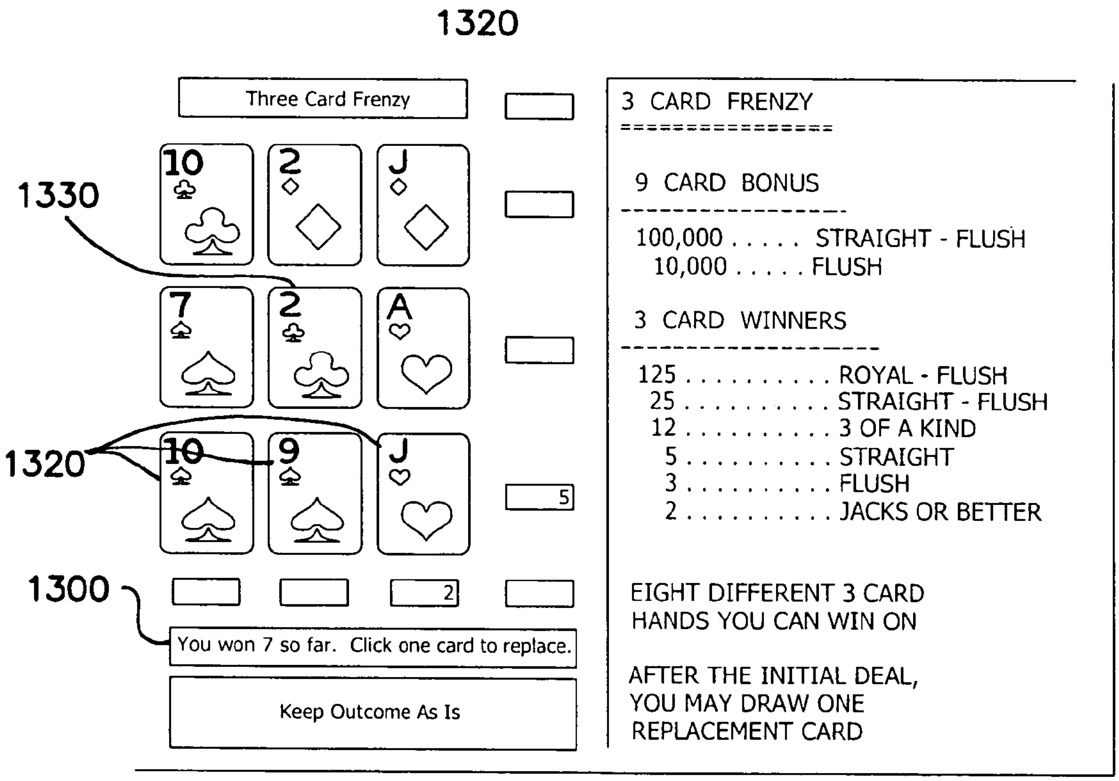
FIG. 13 shows a sample game state, namely awaiting a player to select a card to be replaced.

FIG. 13 is another screen shot similar to FIG. 12 but depicting a different game state, namely the state after initial cards have been displayed, intermediate results have been displayed 1300 and the player is prompted to select a replacement card or forgo such a replacement and hold all cards. This state corresponds to steps 1016 and 1018 from FIG. 10. As with FIG. 10, the screen shot depicts the display of intermediate results including the award amounts associated with each pay line that currently define a winning outcome and the highlighting of cards 1320 that currently form a winning outcome. An alternate implementation may, in addition to the payout, indicate the type of winning outcome, such as "Straight" or "High Pair" for each appropriate pay line.

Figure 14:
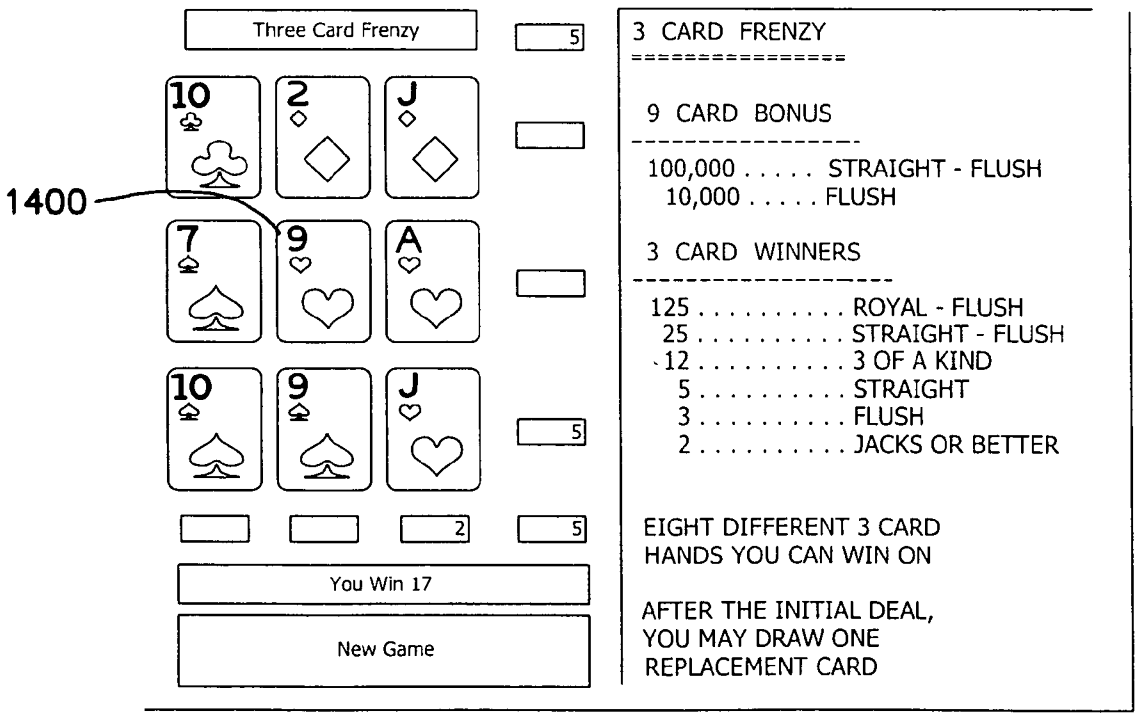
FIG. 14 shows a sample game state, namely a game completed.

FIG. 14 is another screen shot similar to FIG. 13 but depicting a different game state, namely the state after the draw card has been displayed and the outcome finalized. Specifically, the center card (2♣) 1330 from FIG. 13 has been selected and replaced with a new center card (9♥) 1400. Replacing the 2♣ with the 9♥ increases the number of winning pay lines and corresponding payout.

Figure 15:
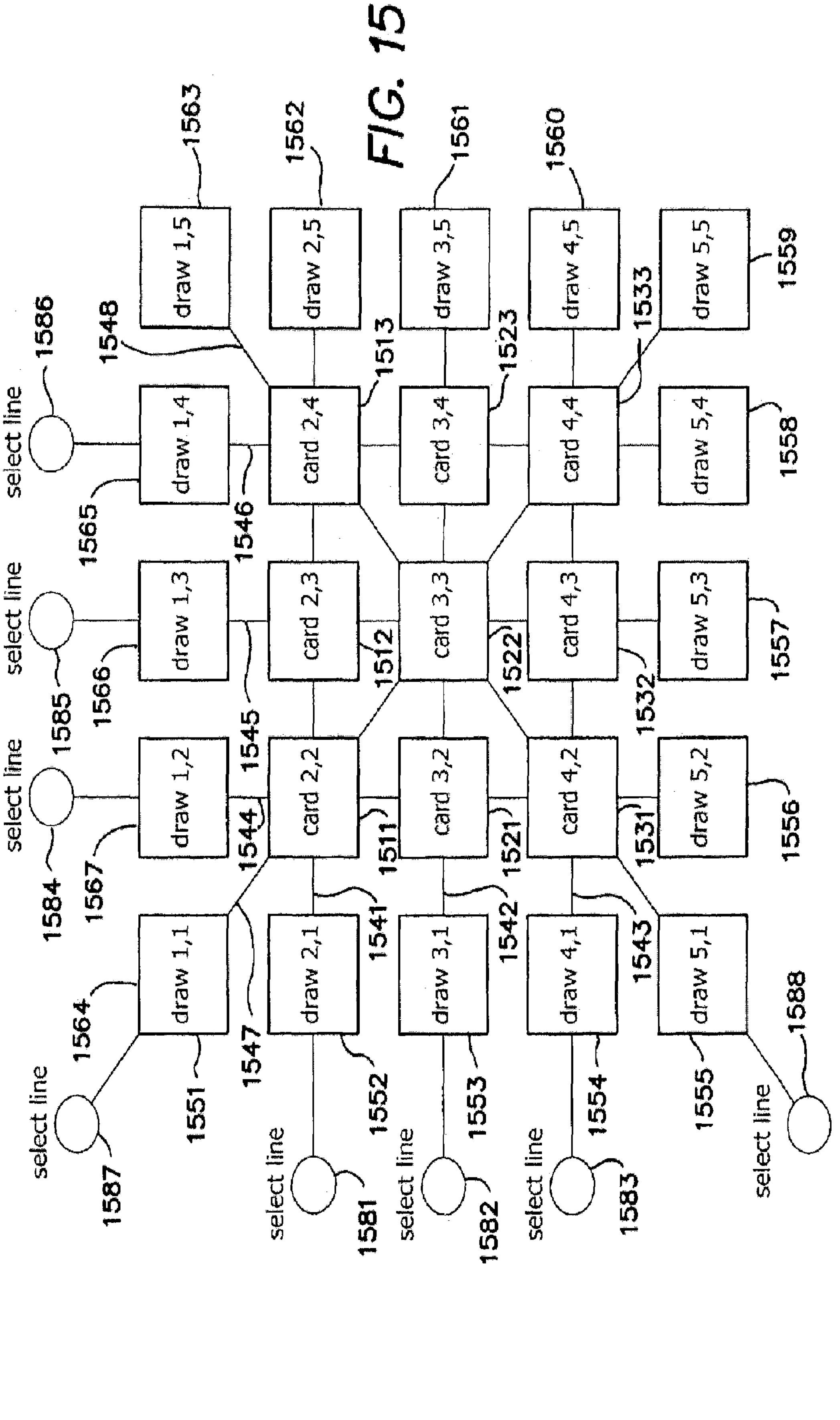
FIG. 15 shows a game having selectable pay lines.
Figure 16:
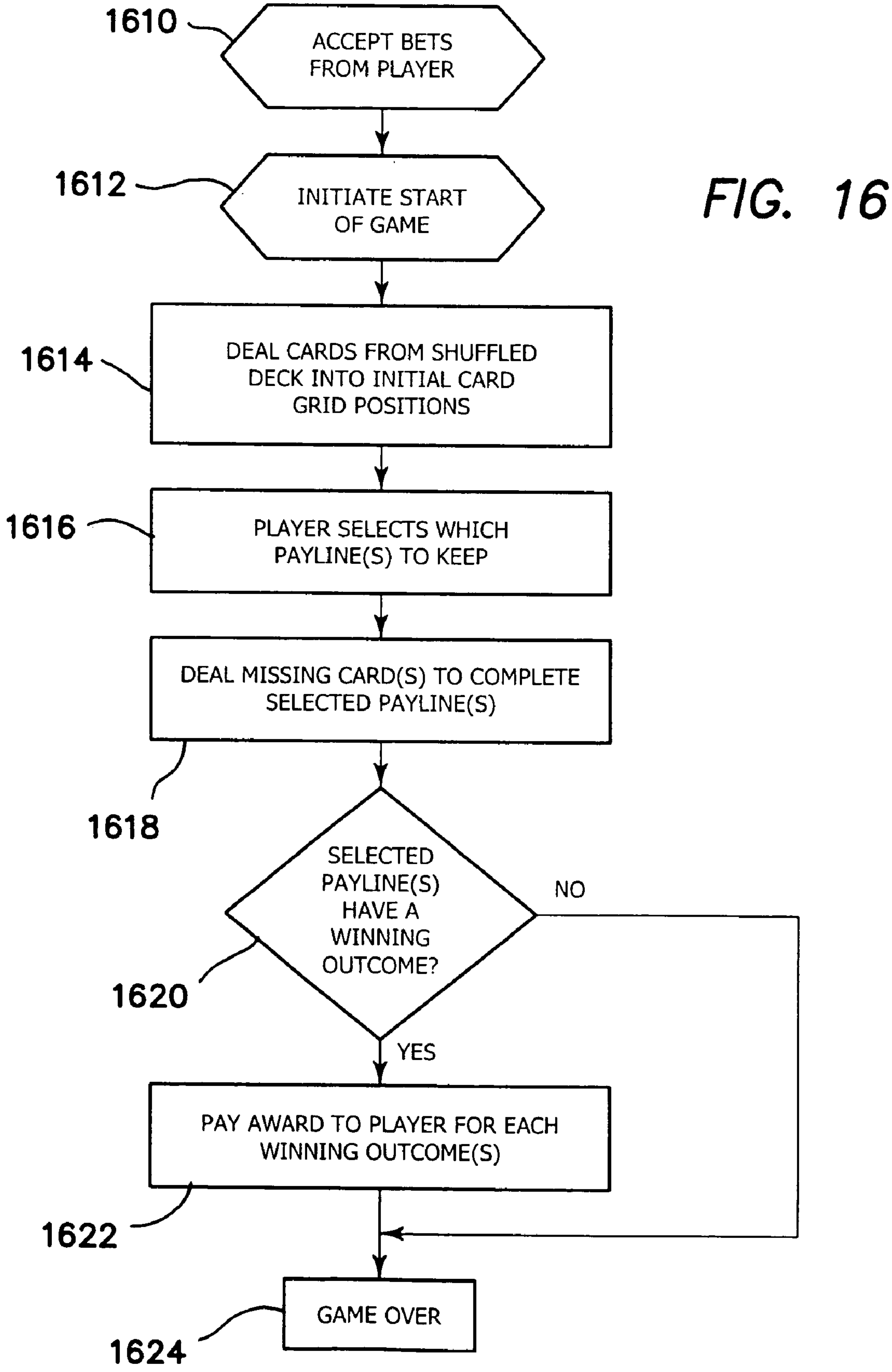
FIG. 16 shows a block diagram of a game having selectable pay lines.

FIG. 15 shows a fifth embodiment of the present invention wherein the card positions into which the draw cards are to be displayed are empty after the initial deal. The initial cards are dealt, displayed or otherwise provided to the center 3×3 grid comprising card positions 1511-1513, 1521-1523, 1531-1533. Eight pay lines, including three horizontal pay lines 1541-1543, three vertical pay lines 1544-1546 and two diagonal pay lines 1547-1548 intersect the card positions 1511-1513, 1521-1523, 1531-1533. Also, associated with each pay line 1541-1548 are two separate draw card positions 1551-1564. For example, pay line 1541 has draw card positions 1552 and 1562 for receiving draw cards 2,1 and 2,5, respectively. At an end of each pay line 1541-1548 is a selector spot 1581-1588 which the player uses after the initial display of cards to indicate the pay line(s) he wishes to select. The draw cards are then displayed to the draw card positions 1551-1564 associated with the selected pay line. A game can be defined such that the player only selects one pay line or multiple pay lines FIG. 16 shows a block diagram of the fifth embodiment of the present invention corresponding to the game shown in FIG. 15. Player wagers are accepted 1610, the game is started 1612 and the initial cards are displayed 1614 into card positions. The player then selects K pay lines 1616, where K is defined by the games rules to be an integer value between one and number less than the number of total pay lines. For each selected pay line, the corresponding draw card positions are filled 1618 with card(s) dealt from the deck. For each selected pay line, the corresponding intersected cards are evaluated to determine whether they correspond to a winning outcome 1620 and for each winning outcome, the player is paid 1622 based on the rules of the game.

Although the invention has been described in detail with reference to several embodiments, additional variations and modifications exist within the scope and spirit of the invention as described and defined in the following claims.

I claim:

1. A gaming device comprising:
at least one display device;
at least one memory device which stores data corresponding to:
(i) a plurality of playing cards configured to fill a grid of card positions, the grid including a plurality of columns of card positions and a plurality of rows of card positions, at least one of the columns intersecting with at least one of the rows at one of the card positions,
(ii) a plurality of outer card positions adjacent to the grid, at least one of the outer card positions being adjacent to one of the columns, and at least one other outer card position being adjacent to one of the rows;
(iii) a plurality of different card combinations, each one of the card combinations being formable by filling the card positions of the grid with a plurality of the playing cards,
(iv) at least one additional card combination formable by filling one of the outer card positions with one of the playing cards, and (v) a plurality of awards, each one of the plurality of awards being associated with a winning condition;
at least one input device; and
at least one processor operable with the at least one display device, the at least one memory device and the at least one input device, the at least one processor programmed to:
(a) cause the at least one display device to display a random filling of each one of the card positions of the grid with a playing card while the outer card positions remain unfilled by playing cards, the filled card positions forming the different card combinations,
(b) after the card positions of the grid are filled, receive a wager, the wager corresponding to a selection of a pay line, the selected pay line corresponding to at least one of:
(i) a first pay line which is associated with:
(x) at least one of the unfilled outer card positions which is adjacent to one of the columns; and
(y) a plurality of the filled card positions of said column of the grid, and
(ii) a second pay line which is associated with:
(x) at least one of the unfilled outer card positions which is adjacent to one of the rows; and
(y) a plurality of the filled card positions of said row of the grid,
(c) fill the at least one unfilled outer card position of the selected pay line with a playing card,
(d) evaluate whether the filled card positions corresponding to the selected pay line form a combination which satisfies one of the winning conditions, and
(e) provide the award associated with the satisfied winning condition, if any.

2. The gaming device of claim 1, wherein each one of the different combinations of the grid has a quantity of card positions which is less than the card combination which satisfies the winning condition, if any.

3. The gaming device of claim 1, which includes a plurality of selectable pay lines associated with the grid, the plurality of selectable pay lines including at least one of: (i) a plurality of the first pay line, and (ii) a plurality of the second pay line.

4. The gaming device of claim 3, which includes a plurality of pay line selectors associated with the plurality of selectable pay lines, each one of the pay line selectors being positioned adjacent to one of the outer card positions of one of the selectable pay lines, and each one of the pay line selectors being configured to indicate the wager after the pay line associated with that pay line selector is selected.

5. A method of operating a gaming device, said method comprising:
(a) accessing data corresponding to:
(i) a plurality of playing cards configured to fill a grid of card positions, the grid including a plurality of columns of card positions and a plurality of rows of card positions, at least one of the columns intersecting with at least one of the rows at one of the card positions,
(ii) a plurality of outer card positions adjacent to the grid, at least one of the outer card positions being adjacent to one of the columns, and at least one other outer card position being adjacent to one of the rows;
(iii) a plurality of different card combinations, each one of the card combinations being formable by filling the card positions of the grid with a plurality of the playing cards,
(iv) at least one additional card combination formable by filling one of the outer card positions with one of the playing cards, and (v) a plurality of awards, each one of the plurality of awards being associated with a winning condition;

(b) controlling a display device of the gaming device to display filling of each one of the card positions of the grid with a playing card while the outer card positions remain unfilled by playing cards, the filled card positions forming the different card combinations;

(c) after the card positions of the grid are filled, receiving a wager, the wager corresponding to a selection of a pay line, the selected pay line corresponding to at least one of:

(i) a first pay line which is associated with:

(x) at least one of the unfilled outer card positions which is adjacent to one of the columns; and (y) a plurality of the filled card positions of said column of the grid, and (ii) a second pay line which is associated with:

(x) at least one of the unfilled outer card positions which is adjacent to one of the rows; and (y) a plurality of the filled card positions of said row of the grid;

(d) controlling the display device to fill the at least one unfilled outer card position of the selected pay line with a playing card;

(e) evaluating whether the filled card positions corresponding to the selected pay line form a combination which satisfies one of the winning conditions; and (f) providing the award associated with the satisfied winning condition, if any.

6. The method of claim 5, wherein each one of the card combinations of the grid has a quantity of card positions which is less than the card combination which satisfies the winning condition, if any.

7. The method of claim 5, which includes causing the at least one display device to display a plurality of selectable pay lines associated with the grid, the plurality of selectable pay lines including at least one of: (i) a plurality of the first pay line, and (ii) a plurality of the second pay line.

8. The method of claim 5, which includes evaluating whether the filled card positions and the at least one unfilled card position corresponding to the selected pay line form an additional combination which satisfies one of the winning conditions; and providing another award associated with the satisfied winning condition, if any.

9. A gaming system comprising:

at least one display device;

at least one input device;

at least one processor; and at least one memory device which stores:

(a) data corresponding to:

(i) a plurality of playing cards configured to fill a grid of card positions, the grid including a plurality of columns of card positions and a plurality of rows of card positions, at least one of the columns intersecting with at least one of the rows at one of the card positions, (ii) a plurality of outer card positions adjacent to the grid, at least one of the outer card positions being adjacent to one of the columns, and at least one other outer card position being adjacent to one of the rows;

(iii) a plurality of different card combinations, each one of the card combinations being formable by filling the card positions of the grid with a plurality of the playing cards, (iv) at least one additional card combination formable by filling one of the outer card positions with one of the playing cards, and (v) a plurality of awards, each one of the plurality of awards being associated with a winning condition; and (b) plurality of instructions, which when executed by the at least one processor, cause the at least one processor to operate with the at least one display device and the at least one input device to:

(i) display a filling of each one of the card positions of the grid with a playing card while the outer card positions remain unfilled by playing cards, the filled card positions forming the different card combinations, (ii) after the card positions of the grid are filled, receive a wager, the wager corresponding to a selection of a pay line, the selected pay line corresponding to at least one of:

(a) a first pay line which is associated with:

(1) at least one of the unfilled outer card positions which is adjacent to one of the columns; and (2) a plurality of the filled card positions of said column of the grid, and (b) a second pay line which is associated with:

(1) at least one of the unfilled outer card positions which is adjacent to one of the rows; and (2) a plurality of the filled card positions of said row of the grid, (iii) display a filling of the at least one unfilled outer card position of the selected pay line with a playing card;

(iv) evaluate whether the filled card positions corresponding to the selected pay line form a combination which satisfies one of the winning conditions, and (v) provide an award associated with the satisfied winning condition, if any.

10. The gaming system of claim 9, wherein the grid has a perimeter, and the outer card positions are arranged about the perimeter.

11. The gaming system of claim 10, which includes a plurality of pay line selector symbols, each one of the pay line selector symbols being adjacent to one of the outer card positions.

* * * * *